United States Patent [19]
Zook et al.

[11] Patent Number: 5,632,918
[45] Date of Patent: May 27, 1997

[54] HEAT DISSIPATING CHIMNEY FOR ADHESIVE SUPPLY UNIT

[75] Inventors: Jon C. Zook; Chris M. Jamison, both of Hendersonville, Tenn.

[73] Assignee: Illinois Tool Works Inc., Glenview, Ill.

[21] Appl. No.: 440,649

[22] Filed: May 15, 1995

[51] Int. Cl.⁶ .................................................. F27B 14/00
[52] U.S. Cl. ........................ 219/420; 219/460; 222/146.2
[58] Field of Search ........................... 219/420–426, 219/430, 431, 440, 460; 222/146 HE

[56] References Cited

U.S. PATENT DOCUMENTS 4,456,151  6/1984  Lewellen ........................... 222/146 HE Primary Examiner—Tu B. Hoang
Attorney, Agent, or Firm—Dvorak and Traub

[57] ABSTRACT

A heat dissipating chimney in an apparatus for the melting and dispensing of solid and quasi-solid materials, such as thermoplastics and hot melt adhesives, is disclosed. Air convection paths are provided which control the flow of heated air from a plurality of heat sources, through the cabinet of the apparatus, eventually exhausting the heated air to atmosphere. Degradation of the performance of heat-sensitive components of the apparatus is avoided by the heat dissipating system provided by the present invention.

4 Claims, 3 Drawing Sheets

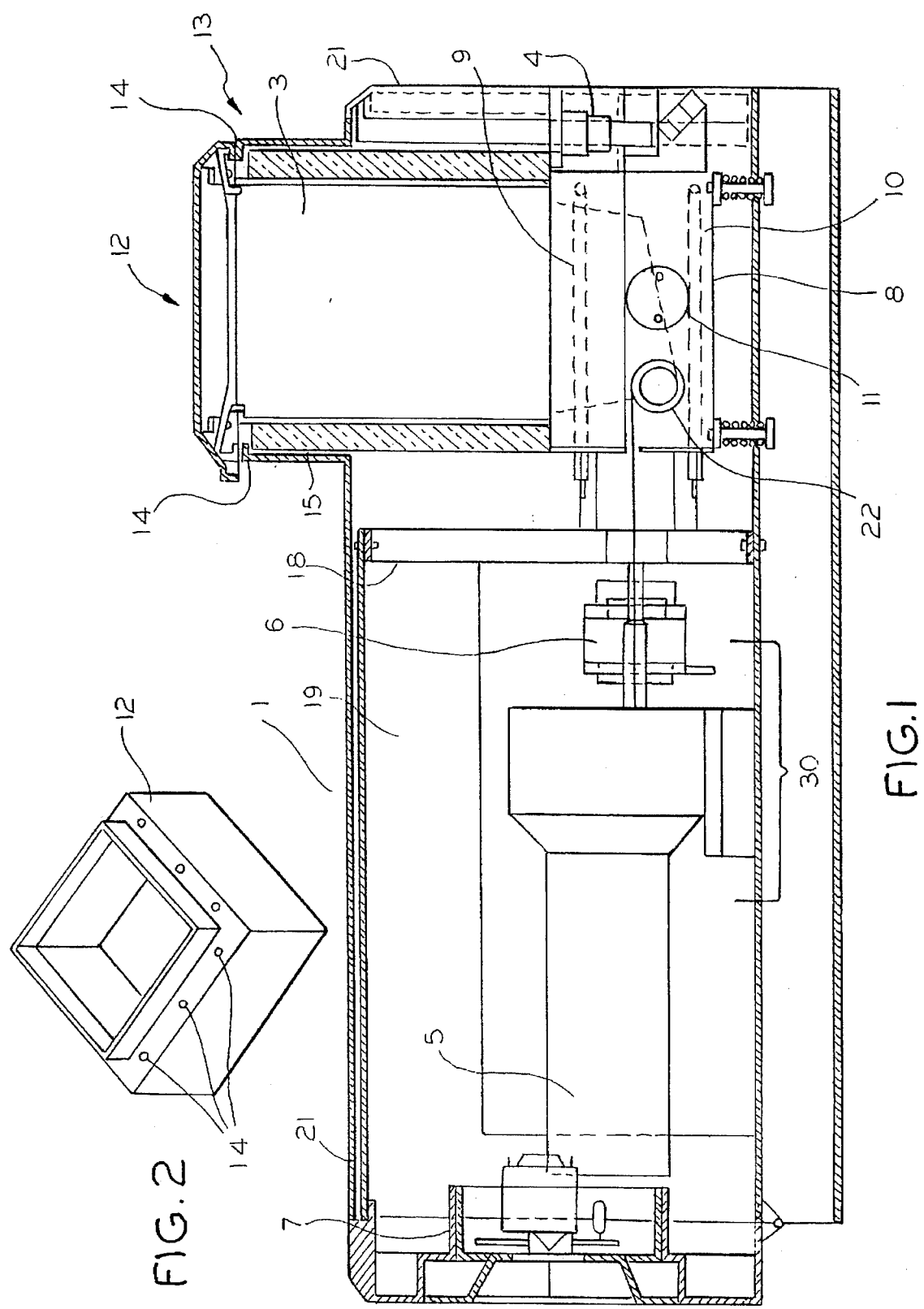

HEAT DISSIPATING CHIMNEY FOR ADHESIVE SUPPLY UNIT

CROSS REFERENCE TO RELATED APPLICATIONS

This application is related to four copending applications entitled:

"Multiple Heat Source Grid Assembly", U.S. Ser. No. 08/440,640, filed on May 15, 1996;

"Viscous Fluid Shut-Off Valve and Filter", U.S. Ser. No. 08/441,385, filed on May 15, 1995;

"Removable Hopper Cover", U.S. Ser. No. 08/440,648, filed on May 15, 1995;

"Adhesive Supply Unit", U.S. Ser. No. 08/038,886, filed on May 15, 1995;

BACKGROUND OF THE INVENTION

1. Field of the Invention

This invention relates to an apparatus for receiving thermoplastic and other hot melt materials and adhesives, melting the material, and supplying the melted material to a dispenser. Non-process heat generated by electronic components, a motor, and the like, and heat lost from the melting process, is channelled through an integral chimney system built into the apparatus in order to more efficiently cool the electronic and other components.

2. Description of the Related Art

In the past, devices for receiving, melting, and dispensing of hot melt materials and adhesives did not consider the problems associated with overheating of electric and other components which formed a part of the device. Generally, attention was focused on the process steps and apparatus as they related directly to the melting and dispensing of hot melt materials. The prior art did not address the problems associated with the environment in which the various components operated. As a result, inadequate cooling and the resultant overheating of electric and electro-mechanical components in the hot melt devices led to many problems, such as electronic component failure, premature malfunction, and erratic performance.

Improvements in the form of improved heat transfer characteristics of individual components were achieved in the past, but the problems associated with damaging heat buildup within the cabinet of a hot melt unit as a whole have not been previously addressed or solved.

It is therefore an object of the present invention to provide a system for reducing the buildup of heat within the cabinet of a hot melt device. Specifically, it is an object of the present invention to design and integrate the components of a hot melt device to form a chimney which draws heat away from critical electrical and other components. The result is that the performance of individual components, and therefore the entire unit, is maintained at an acceptably high level, absent the thermal damage which would otherwise degrade performance.

BRIEF SUMMARY OF THE DRAWINGS

FIG. 1 is a side view of the present invention illustrating the entire melting/dispensing apparatus.

FIG. 2 is a perspective view of the top area of the hopper.

DESCRIPTION OF THE PREFERRED EMBODIMENTS

Figure 3:
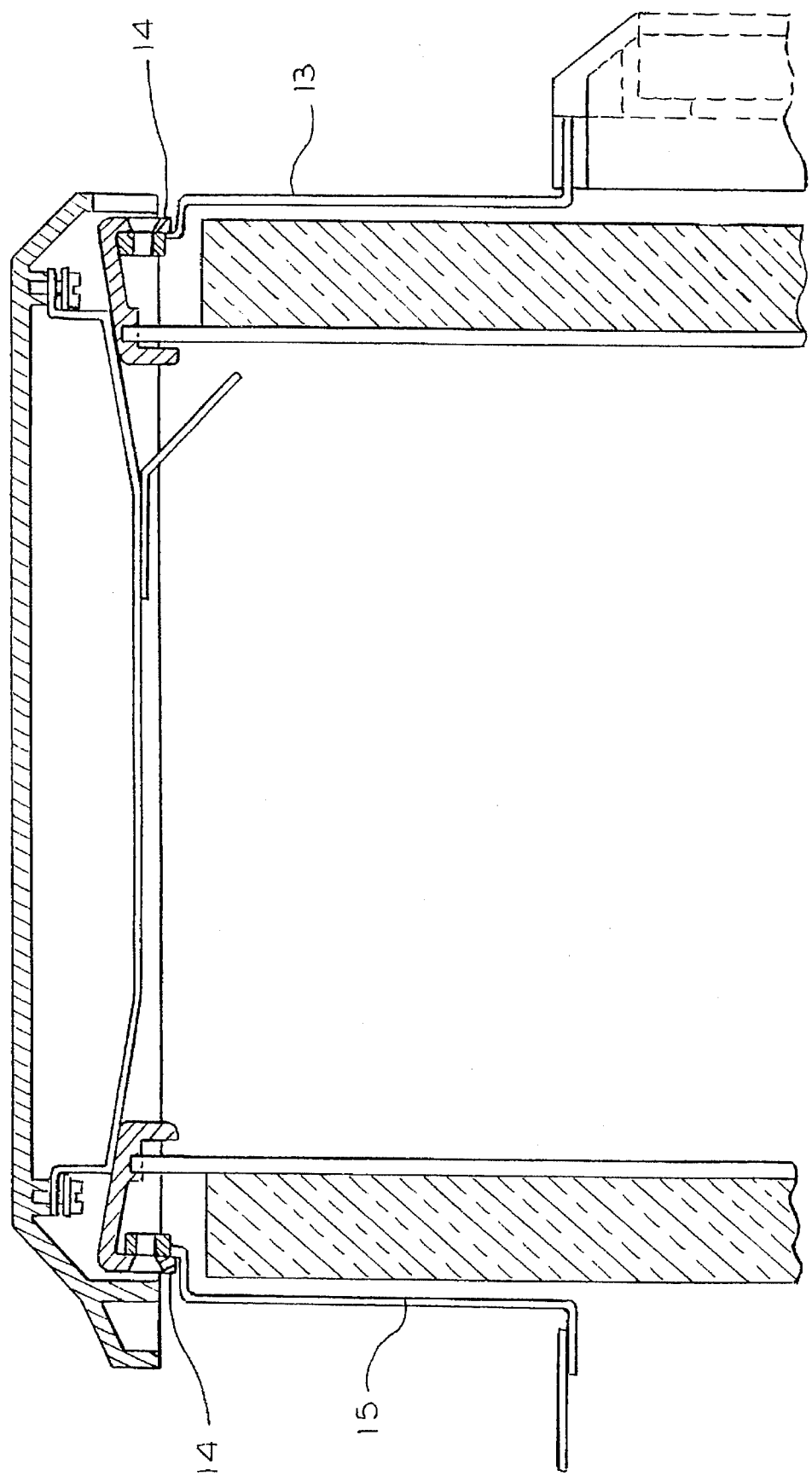
FIG. 3 is a detailed cross-sectional view of the top area of the hopper.

Referring to the drawings, FIG. 1 shows a material melting and dispensing apparatus 1 having a cabinet 21, a hopper 3, and hopper cover 12. Solid and quasi-solid material to be melted, such as hot melt adhesive pellets, are added to the hopper 3. Heat is supplied to the melter body 8 through the upper and lower heating elements 9 and 10. The heated material is drawn through the shut-off valve and filter 22 and is subsequently pumped by pumping means 30, the pumping means being driven by the prime mover 5 through the coupling 6. Feedback is provided by the temperature sensing means 11, and control of the process is maintained by the control panel 7. The material is dispensed as needed through the shut-off valve/filter 22 and eventually through the dispensing means 4. Heat generated in the electronic component enclosure 19 is drawn through vent apertures 18 to a top section 13 of the hopper 3. This heat travels by natural convection through the flue 15 and eventually exits at the exhaust apertures 14.

Referring now specifically to the heat dissipating chimney, FIG. 2 shows the hopper top section 13 which generally forms an external shell for the top portion of the hopper. It will be noted that in one embodiment, the hopper top section may be formed of sheet metal or plastic material. This hopper top section 13 is attached to and generally forms a semi-seal with the remainder of the material melting and dispensing apparatus 1. Exhaust apertures 14 are formed at an upper region of the hopper top section 13. These exhaust apertures 14 are in communication with the flue and other heat dissipating elements of the chimney.

FIG. 3 shows a detail of the hopper top section 13, illustrating the flue 15 and the exhaust holes 14.

Figure 4:
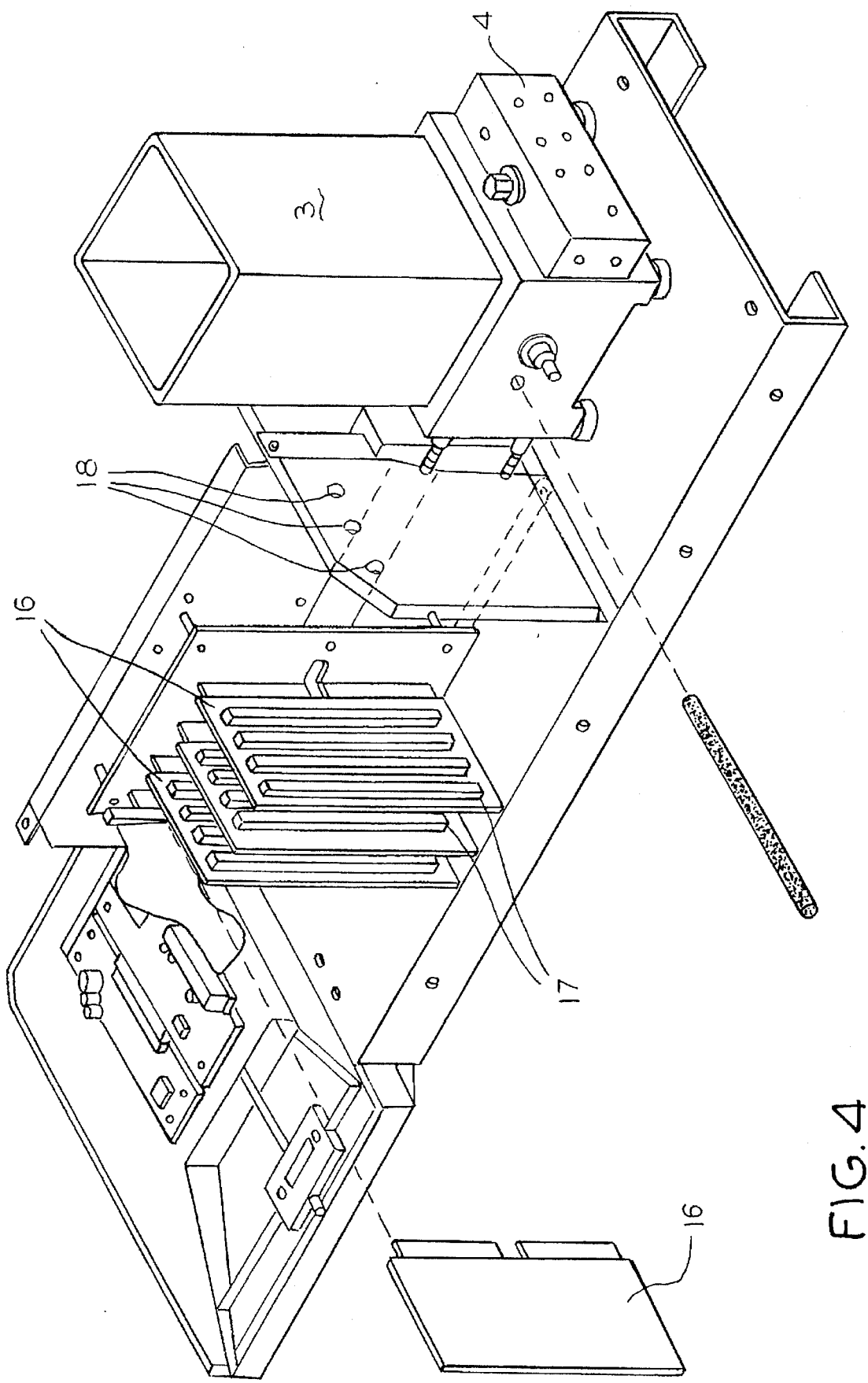
FIG. 4 is a cut-away perspective view of the present invention.

FIG. 4 is a cut-away view of the invention showing the initial path of the generated heat in the form of warmed air and possibly other gases travelling by convection from the electronic heat generating components 16, through the apertures 18, into the flue 15, and finally out of the exhaust apertures 14.

Heat exchange fins 17 are arranged vertically to advantageously direct the convective heat flow vertically upwards in an unencumbered path towards the top of the exhaust and out the vent apertures 18.

It will be noted that the electronic heat sources include all electronic control equipment, all electronic circuits housed within the cabinet, and all electro-mechanical devices and motors within the cabinet. In addition to those heat sources are heat sources relating directly to the melting process, such as the upper and lower heating elements 9 and 10, which transfer heat to the melter body 8 and related components. The stray heat transferred from these components also travels by convection to the flue 15 and eventually out of the exhaust apertures 14.

A chimney effect is produced by the convective heat paths provided in the present invention. As warmed air having a lower density than ambient air travels out through the exhaust apertures, it is replaced by cooler air drawn in through gaps in the cabinet, particularly near the base of the cabinet.

As the various heat sources transfer heat from the heat sources to the cooler air, the air is warmed, causing it to become less dense, and then travel upwards through the path of least resistance provided by the present invention. This path directs the warmed air out of the exhaust apertures, whereby it is again replaced by cooler air at a distant location. This cycle is continuous during operation of the material melting and dispensing apparatus 1, resulting in consistent cooling of the involved electronic and other components.

A single preferred embodiment of the present invention is described above. However, those skilled in the art will appreciate the various modifications which could be made to the present invention without departing from the scope of the invention. The invention is therefore not limited except by the scope of the appended claims.

We claim:

1. An apparatus for melting solid and quasi-solid material, and for dispensing the same, comprising:

a material receiving and melting means having at least one heat source for melting said material;

means for transporting melted material to a delivery point, said means in communication with said receiving and melting means, wherein the means for transporting melted material comprises a pumping means and a prime mover means for driving the pumping means, the means for transporting melted material dissipating heat therefrom so as to create another heat source;

electronic power and control circuitry arranged and constructed to provide and control electrical power and signals for the apparatus, the electronic controls and integration circuitry dissipating heat therefrom so as to create at least a third and a fourth heat source; and a cabinet for holding said receiving and melting means, said transporting means, and said electronic power and control circuitry, said cabinet including a venting means wherein air that is contained therein and cummulatively heated by each of the heating sources is directed through the cabinet and exhausted through at least one exhaust aperture therein.

2. The apparatus according to claim 1, wherein the venting means further comprises at least one exhaust aperture in a hopper top section, an electronic component separation plate, said plate disposed generally between the receiving and melting means and electronic power and control circuitry, the separation plate having at least one vent aperture disposed poximate a top portion of the separation plate so as to create at least one heat convection path for convectively communicating heat originating at each of the heat sources, flue means disposed in the hopper top section, the flue means being in communication with the exhaust aperture and the heat convection path, wherein heated air emanating from each of the heat sources travels by natural convection along the heat convection path and through the vent aperture, thereby traveling into the flue means and escaping said apparatus through the exhaust aperture.

3. The apparatus according to claim 2, wherein the electronic power and control circuitry comprises at least one electronic component having a plurality of vertically extending cooling fins thereon, said fins disposed in at least one of said heat convection paths, wherein heated air is directed upward along said electronic component by the cooling fins.

4. The apparatus according to claim 3, wherein the flue means comprises a vertical gap disposed between an outer wall of the hopper top section and the hopper, wherein said heated air travels through the vent aperture, and then through the vertical gap, before escaping through the exhaust aperture.

* * * * *